(12) United States Patent
Greenwood et al.

(10) Patent No.: US 8,345,727 B2
(45) Date of Patent: Jan. 1, 2013

(54) COMMUNICATION SYSTEM, APPARATUS, AND METHODS

(75) Inventors: Douglas Greenwood, Sterling, VA (US); William J. Chastain, Incline Village, NV (US)

(73) Assignee: Metropolitan Area Networks, Inc., Sterling, VA (US)

(*) Notice: Subject to any disclaimer, the term of this patent is extended or adjusted under 35 U.S.C. 154(b) by 904 days.

(21) Appl. No.: 12/464,776

(22) Filed: May 12, 2009

(65) Prior Publication Data

US 2009/0323776 A1  Dec. 31, 2009

Related U.S. Application Data

(60) Provisional application No. 61/052,853, filed on May 13, 2008.

(51) Int. Cl.
*H04B 1/707* (2011.01)
(52) U.S. Cl. ...................................... 375/146
(58) Field of Classification Search .................. 375/130, 375/140, 146, 259, 261, 295
See application file for complete search history.

(56) References Cited

U.S. PATENT DOCUMENTS

| 5,473,632 | A | 12/1995 | Riedel et al. |
|---|---|---|---|
| 6,275,548 | B1 | 8/2001 | Wolf et al. |
| 7,512,697 | B2 * | 3/2009 | Lassen et al. ............... 709/230 |
| 7,983,356 | B2 * | 7/2011 | Chrabieh et al. ............ 375/295 |
| 2004/0008797 | A1 | 1/2004 | Koslar et al. |
| 2007/0025738 | A1 | 2/2007 | Moore |

OTHER PUBLICATIONS

Takeda et al Time-domain Spreading and Frequency-domain Spreading for Delay-time/Code Division Multi-Access IEEE Publication on Vehicular Tech. Conference, May 11-14, 2008, pp. 1529-1533. with abstract.*
International Search Report dated Dec. 30, 2009 for PCT Application No. PCT/US2009/043652.

* cited by examiner

*Primary Examiner* — Kevin M Burd
(74) *Attorney, Agent, or Firm* — Goodwin Procter LLP (57) ABSTRACT

A system, method and apparatus for wireless communications are provided. In an exemplary embodiment, frequency components present in a short duration modulated complex pulse is used to represent data to be sent. In other embodiments, the complex pulse is created, modulated, then modified to have desirable frequency characteristics. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

11 Claims, 11 Drawing Sheets

COMMUNICATION SYSTEM, APPARATUS, AND METHODS

CROSS REFERENCE TO RELATED APPLICATIONS

This application is related to and claims the benefit of priority to U.S. Provisional Application Ser. No. 61/052,853, entitled "COMMUNICATION SYSTEM, APPARATUS, AND METHODS", filed May 13, 2008, the entirety of which is hereby incorporated by reference.

FIELD OF THE INVENTION

The present invention generally relates to communications. More particularly, the invention concerns a system methods and apparatus for wireless communications.

BACKGROUND OF THE INVENTION

Wireless communications systems are delivering ever increasing content to consumers. In the field of wireless communications devices may be classified as licensed or unlicensed. This typically relates to the spectrum in which the device operates. Recently, there have been new types of communications technology that do not fit into the traditional regime. Some of these devices are capable of reusing frequencies that are typically licensed spectrum.

One example of these devices is a technology commonly referred to as Ultra-Wideband. This technology takes many forms but is characterized by very low power emissions across significantly large frequency bands. In the United States, the Federal Communications Commission (FCC) has allowed these types of devices to intentionally transmit in frequencies typically licensed to other services. The transmission is significantly limited in power and therefore the devices do not pose significant interference risks to other incumbent users of the spectrum.

Recently, the FCC has allowed the reuse of frequencies normally assigned to television broadcasters. This reuse by unlicensed transmitters, is limited to specific geographical regions where television broadcasters are not present. Once again the transmissions are power and frequency band limited and pose no significant interference risk to incumbent users. In the U.S. the broadcast television spectrum is broken up into 6 MHz channels beginning around 50 MHz and extending up to 700-800 MHz. The spectrum is not continuous and other users, such as FM Radio, are within this spectrum with broadcast television.

In the design of wireless communications systems, design choices must be made as to the type of modulation used. Modulation, as is known in the art, is the process of encoding information on a signal that is to be transmitted. Typically, the transmitter modulates data onto the signal and transmits. A receiver then demodulates the data from the received signal. The choice of modulation impacts a number of communication parameters. For example, a selection of Binary Phase Shift Keying as a modulation technique can limit the transmission to one of two phases and therefore a single bit of information per signal. Other techniques may encode more information per signal and often modulation techniques can be classified by their ability to carry information in a constrained bandwidth. This "bandwidth efficiency" is often expressed in bits-per-Hertz. Another parameter that is impacted by the selection of a modulation technique is the spectrum the signal occupies. In many situations, present communication technologies, when operating in the television frequency bands, will be inefficient in their ability to carry large amounts of data.

Therefore there exists a need for a system, and methods for improved wireless communications.

SUMMARY OF THE INVENTION

The present invention provides a methods communicating data in a wireless communication medium in underutilized frequency bands. In an exemplary embodiment, the provided method first and second data symbols are combined with first and second codes to form first and second spread data symbols. The first and second data symbols are then combined to form a combined data symbol. A complex pulse is then generated. The complex pulse contains an in-phase component and a quadrature-phase component. The complex pulse is then phase modulated by the combined data symbol. A processor in the communication device then computes the frequency domain representation of the modulated complex pulse to form a frequency domain representation. The processor then edits the frequency domain representation and computes a time domain response of the edited frequency domain representation. The time domain response is then transmitted through the antenna of the communication device.

In another embodiment of a provided method a subset of frequency components is selected from the frequency representation of a modulated complex pulse. The selected component frequencies are then spread by a spreading code and a composite time domain response generated from the spread frequency components. The time domain response is then transmitted through the antenna. In a further embodiment, a standard set of waveforms is defined. Each of the set represents a set of frequencies contained within a modulated complex pulse. These waveforms are then stored in memory. A first data symbol is then used to select one of the stored waveforms. The selected waveform is then spread by a first code. The first spread waveform is then stored in an accumulated symbol register. A second data symbol is used to select a second waveform. The second waveform is spread with a second code and then combined with the first spread waveform in the accumulated symbol register. The combined waveform is then transmitted through the antenna.

Features of these embodiments is that they allow communication systems that include traditional transmit stations, such as AM or FM radio stations to increase their throughput. These stations transmit geographic information related to available frequencies. In a further embodiment, the modulation technique employed includes highly overlapped orthogonal codes employed on each of the plurality of signals.

One feature of various embodiments of the present invention is they provide high data rate services within constrained bandwidths.

BRIEF DESCRIPTION OF THE DRAWINGS

Various embodiments of the present invention taught herein are illustrated by way of example, and not by way of limitation, in the figures of the accompanying drawings, in which.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to anyone of the embodiments of the invention described herein, and any equivalents. Furthermore, reference to various feature(s) of the "present invention" throughout this document does not mean that all claimed embodiments or methods must include the referenced feature(s).

Modern communication systems are changing the way we live our lives. From the advent of the telegraph through telephones and wireless interactive communication systems, the complexity of communications is ever increasing. Additionally, consumers of telecommunications technologies are demanding more services and convenient delivery modalities. The ever increasing need for bandwidth has driven an entire industry to new heights. In the development of new communications technologies a number of constraints must be considered. For example, a designer must decide what frequencies the device will operate in, what modulation technique to employ, and what transmit power is available. Some of these considerations will be driven by regulations.

In the United States, the Federal Communications Commission (FCC) is the regulatory body tasked with management of spectrum for commercial uses. Over the years the FCC has promulgated numerous regulations regarding the use of the airways. At the very core of these regulations is the distinction between licensed spectrum and unlicensed spectrum. In short, licensed users of spectrum have a right to use spectrum free of harm from intentional emissions. In contrast, unlicensed devices must accept all interference. The FCC's regulations for any particular technology typically include a "spectral mask" which designates transmit powers within a frequency band. Additionally, these spectral masks designate the suppression of emissions outside of the mask. These "out-of-band emissions, in some cases are referenced to the in band emissions. Further, the regulations impose strict limits on "spurious" emissions. These emissions are typically caused by the supporting electronics within the device and are not part of the intentional radiation of the device. Currently, the limitations on spurious emissions in most frequency bands are limited to −41.3 dBm.

There are a number of new communications technologies where the FCC has allowed reuse or shared use of licensed spectrum. In these cases a threshold consideration by the FCC is the likelihood of harmful interference to licensed users. One such technology, commonly referred to as Ultra-Wide-band (UWB) is allowed to transmit under FCC guidelines at the same spurious emission limit of −41.3 dBm across significantly wide bandwidths. The U.S. regulatory mask for this technology extends from 3.1 GHz to 10.6 GHz. Since the intentional transmission is at the same power limit of spurious noise these devices pose no greater risk to licensed users than other electronics generating unintentional spurious noise.

In another proceeding, the FCC considered the television broadcast frequency bands. In these frequencies, licenses are allocated geographically. Since the transmit power of a television broadcast station is significant, the geographical areas where any specific channel may be transmitted are limited. Further, in the geographical frequency reuse plan, there are a number of geographical areas where any specific frequency can not be transmitted out of concern for interference in adjacent geographical areas. These "white spaces" presented the FCC with an opportunity to allow low-power unlicensed devices to operate without the threat of harmful interference to adjacent geographical areas.

These TV broadcast frequency allocations in the U.S. are 6-MHz wide, and begin around 50 MHz. The TV broadcast spectrum is not continuous. It is within this arena that some embodiments of the present invention provide significant advantages over other contemplated communications techniques. It is important to note, that while embodiments of the present invention are described herein as applicable to this spectrum, the teachings herein are additionally applicable to other frequency allocations. While some embodiments are directed to and specifically limited to this spectrum, others are not.

Figure 1:
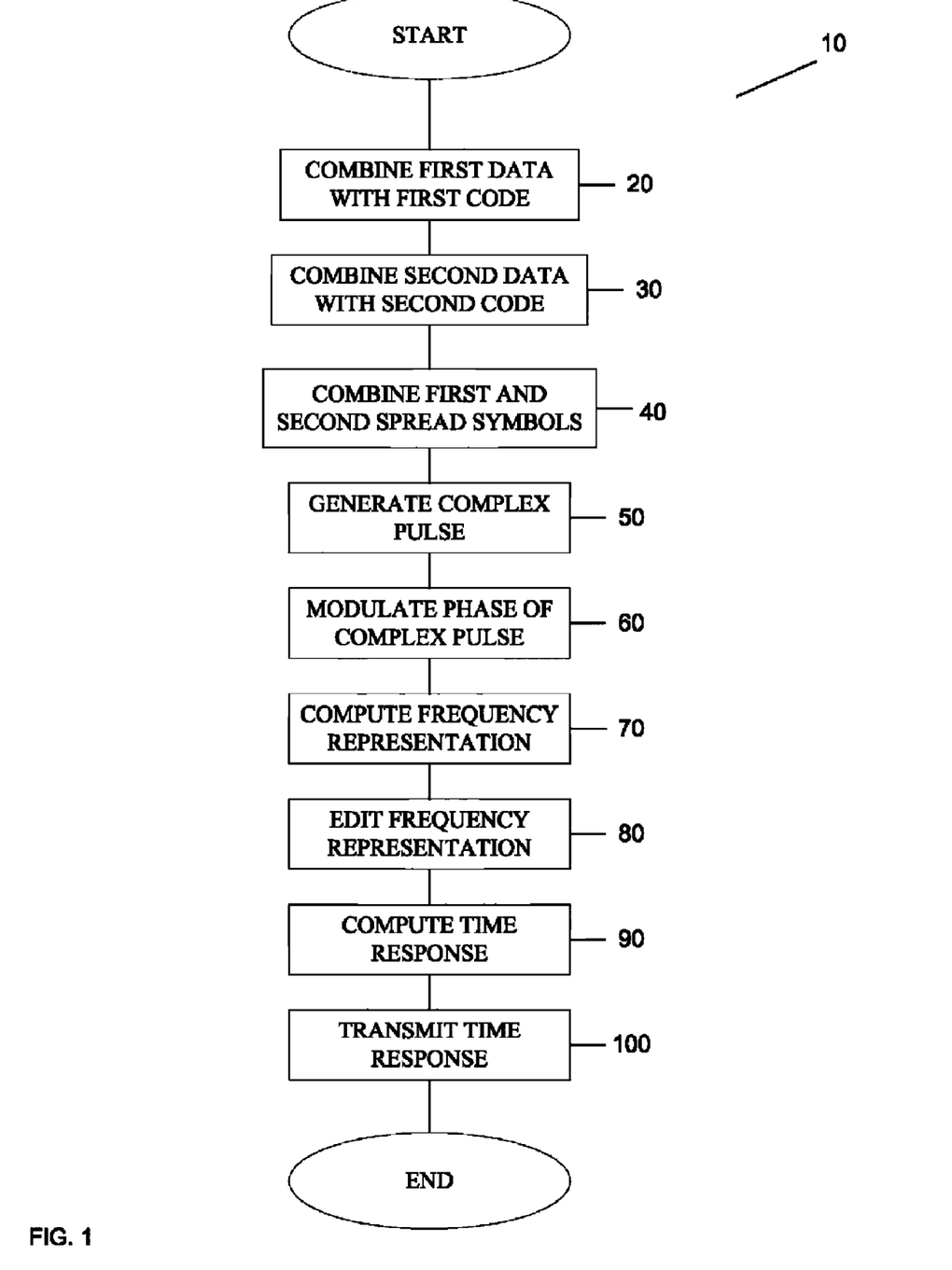
FIG. 1 is a flowchart illustrating the flow of a provided method.

An exemplary provided method 10, illustrated in FIG. 1 includes a modulation technique that provides significantly high data rates and a significant amount of control of the occupied bandwidth. In this method flow begins with block 20 where a first code is combined with a first data symbol. Flow then continues to block 30 where a second data symbol is combined with a second code. In block 40 the first and second spread data symbols are combined together. Flow then continues to block 50 where a complex data pulse is generated. In block 60 the complex data pulse is modulated by the combined spread data symbol. Flow then continues to block 70 where a frequency domain representation of the modulated complex pulse is calculated. Flow then continues to block 80 where the frequency response is modified or edited.

Once edited, flow continues to block 100 where the time domain response is calculated and in block 100 the time domain response is transmitted into the medium through the antenna.

In some embodiments, the operation of combining the first and second data symbols with codes includes spreading the symbols by a set of codes to improve their orthogonality to each other. Various code families are known in the art and may be used to practice embodiments of the invention, but exemplary codes include orthogonal codes, Walsh codes, orthogonal PN codes, quasi-orthogonal PN codes, gold codes, and Golay codes. As is known in the art, the process of spreading a signal by a code may be accomplished in a number of ways. First, when the code and data symbol are in a (0, 1) domain, Exclusive Or gates are typically used to accomplish spreading of a data symbol having a longer duration by a code with a shorter chip rate. When the code and data symbol have been mapped into the (1, −1) domain, multipliers are typically used to combine or "spread" the data symbol by the shorter chip-duration code. A person of ordinary skill will also recognize that the term "complex pulse" refers to a pulse that contains both an in-phase component and a quadrature phase component. In an exemplary embodiment the complex pulse is made up of an in-phase component that is approximated by $$\frac{\cos(x)}{x}$$

and the quadrature phase component is approximated by $$\frac{\sin(x)}{x}.$$

Figure 4:
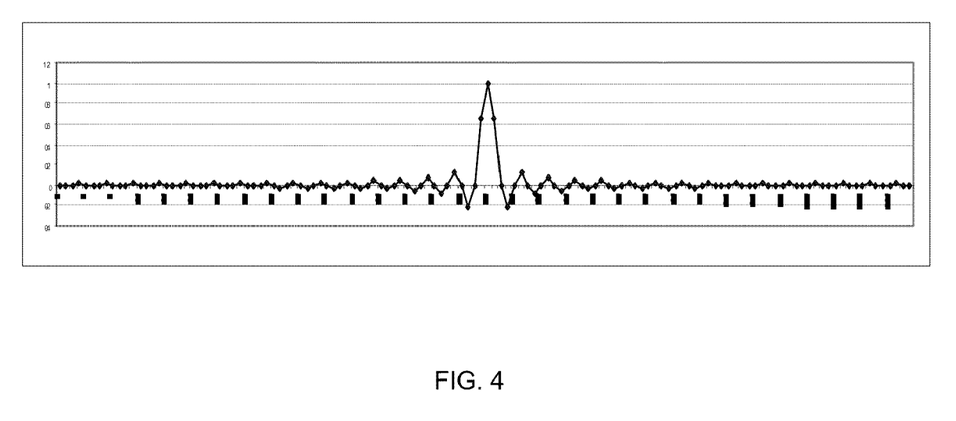
FIG. 4 illustrates a quadrature phase component of a complex pulse consistent with provided embodiments.

An illustration of an approximation of $$\frac{\sin(x)}{x}$$

is provided in FIG. 4.

Figure 2:
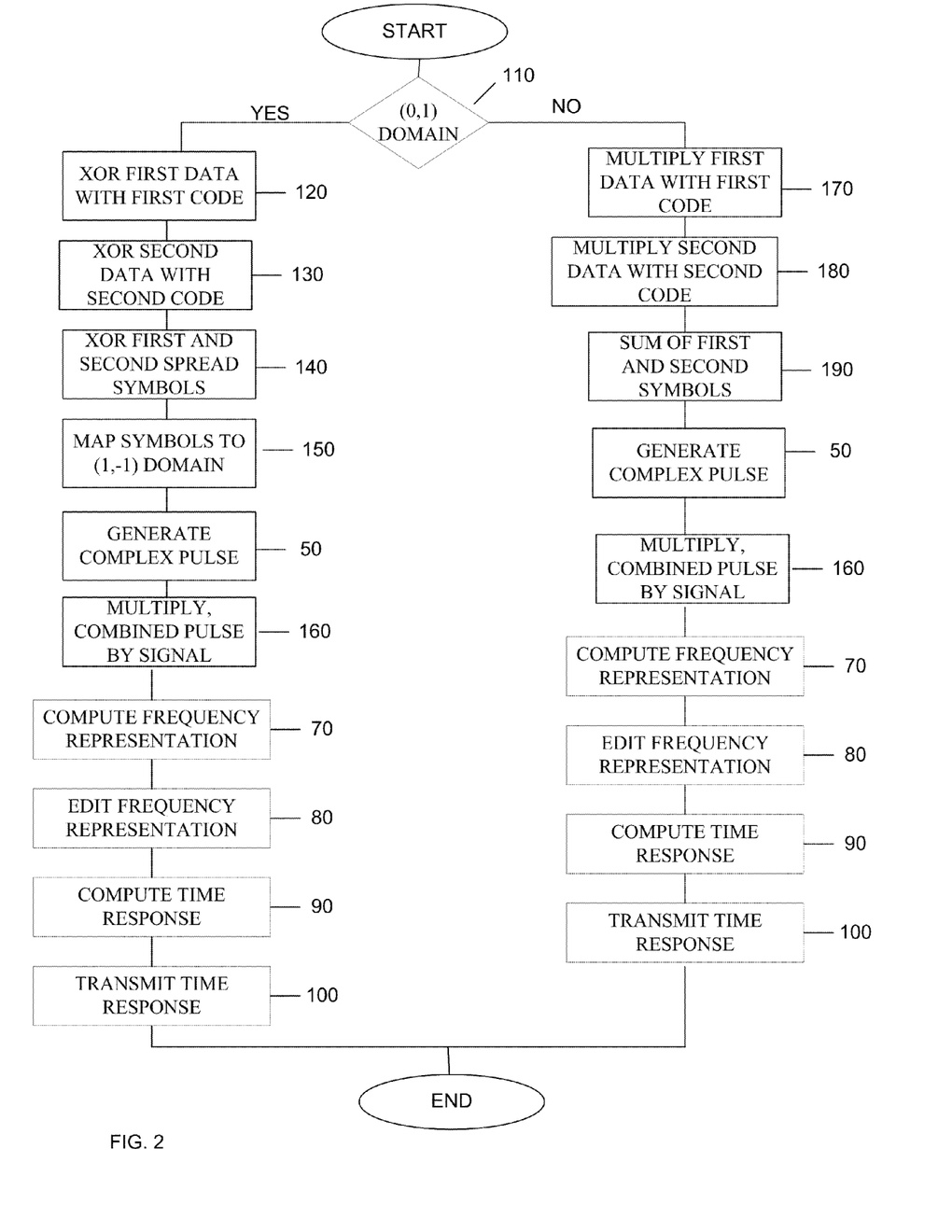
FIG. 2 is a flowchart illustrating the flow of a provided method.

The flow of another provided method is illustrated in FIG. 2. In this embodiment the appropriate data domain is determined in decision block 110. If it is determined that the data domain is the (0, 1) domain, flow continues to block 120 where a first data symbol is spread by an Exclusive Or with a first code. Flow continues to block 130 where a second data symbol is spread by an Exclusive Or with a second code. In block 140 a modulo-2 addition is performed on the two spread symbols by another Exclusive Or function or gate. Flow continues to block 140 where a signal point mapping is performed mapping the domain from (0, 1) to (1, −1). Flow continues to block 50 where a complex pulse is generated and on to block 160 where the complex pulse is multiplied, or modulated, by the combined data symbol. Like with the above embodiment, flow then continues to block 70 where a frequency domain representation of the modulated complex pulse is calculated. Flow then continues to block 80 where the frequency response is modified or edited. Once edited, flow continues to block 100 where the time domain response is calculated and in block 100 the time domain response is transmitted into the medium through the antenna.

Returning to decision block 110, if it is determined that the data domain is (1, −1) flow continues to block 170 where a first data symbol is spread by a first code. As previously discussed in this domain spreading is accomplished by a multiplier instead of an Exclusive Or gate. Flow continues to block 180 where a second data symbol is multiplied by a second code. In block 190 the first and second spread symbols are summed producing a combined symbol. Flow continues to block 50 where a complex pulse is generated and on to block 160 where the complex pulse is multiplied, or modulated, by the combined data symbol. Like with the above embodiment, flow then continues to block 70 where a frequency domain representation of the modulated complex pulse is calculated. Flow then continues to block 80 where the frequency response is modified or edited. Once edited, flow continues to block 100 where the time domain response is calculated and in block 100 the time domain response is transmitted into the medium through the antenna.

Figure 6:
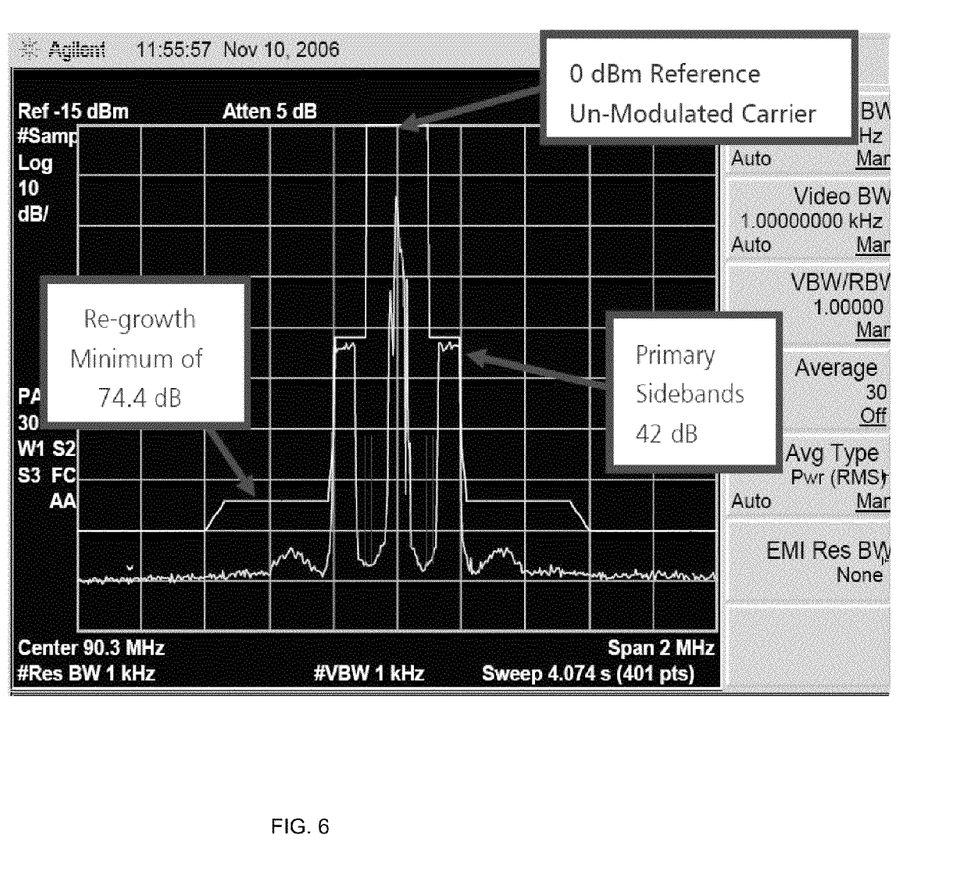
FIG. 6 illustrates the occupancy of a frequency mask for authorized transmission in the FM radio frequency bands.
Figure 7:
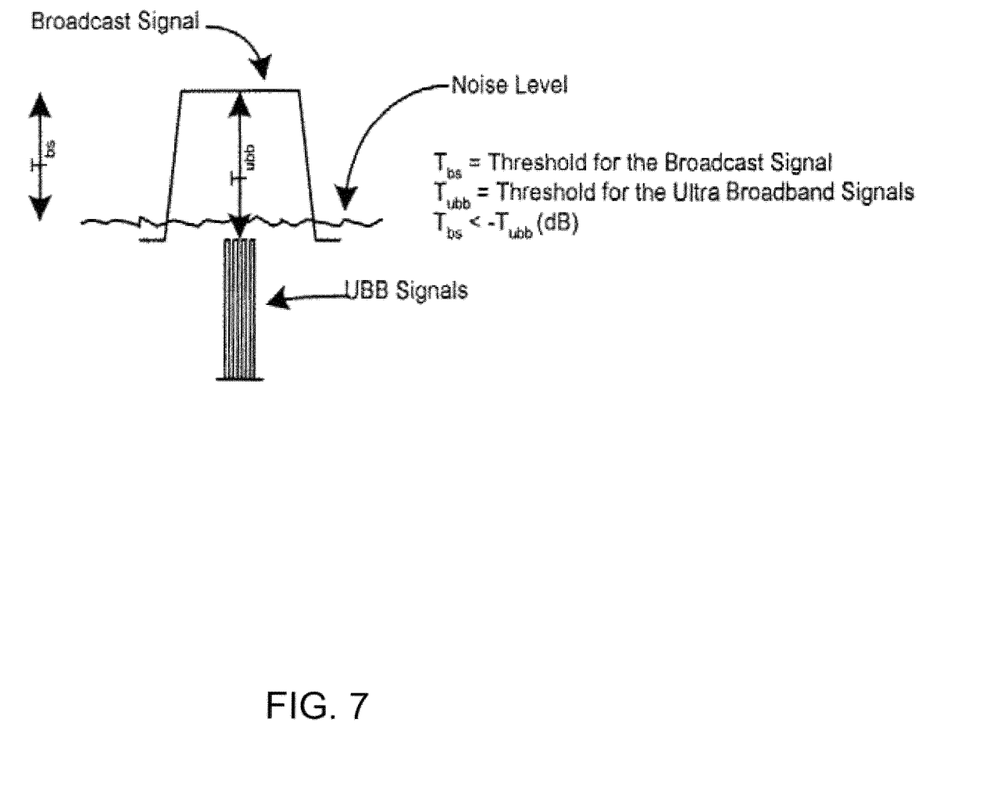
FIG. 7 illustrates embedding a signal into a broadcast station signal.

In some provided embodiments, the modulation of the complex pulse changes the phase of both the in-phase and quadrature phase components of the pulse simultaneously based on a single data symbol. In other embodiments, two data symbols are used to modulate the in-phase component separately from the quadrature component. In other embodiments, the amplitude of the in-phase and quadrature phase components are modulated by data. A number of modulation techniques are known in the art and may be used to practice the invention. Exemplary modulation techniques include phase modulation, amplitude modulation Binary Phase Shift keying, Quadrature Phase Shift Keying and Quadrature-Amplitude Modulation. In further embodiments, in block 80 where the frequency response is modified or edited, the amplitude of certain frequencies may be reduced so the transmitted signal fits within a particular mask. Signal occupancy within a regulatory mask is illustrated in FIG. 6.

Figure 3:
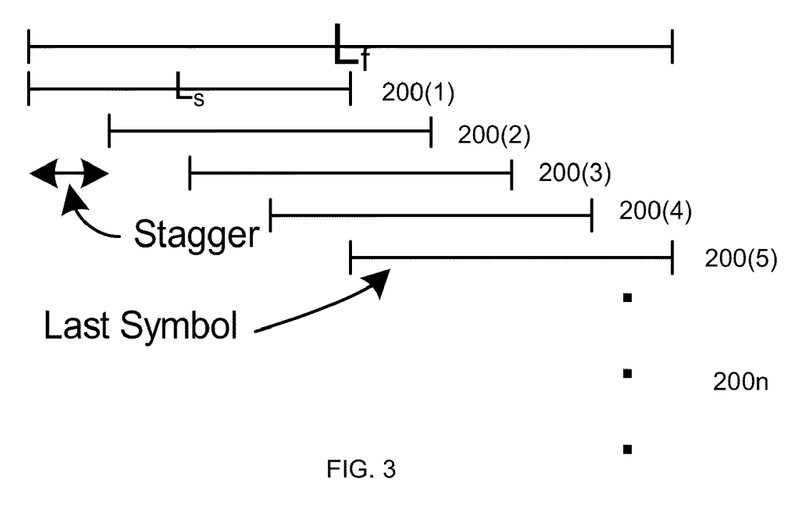
FIG. 3 illustrates the overlapping nature of data symbols consistent with provided embodiments.

In some provided embodiments, data symbols are staggered in time and substantially overlap. Due to the orthogonal nature of codes applied to the symbols, they can be combined in this manner and still be detected at the receiver. For example, FIG. 3 illustrates a plurality of data symbols 200(1) through 200(*n*). As illustrated each of these symbols is time-offset or "staggered" by a predetermined amount of time. In some respects this time offset of data symbols is similar to what a receiver would experience with multi-path from a single symbol transmission. As is known in the art, multi-path is a phenomenon related to signal propagation in a real world environment. Since electromagnetic wave propagation occurs at approximately the speed of light (roughly 1-foot per nanosecond) and the signal may be radiated isotropically, a first copy of the intended transmission may arrive on a direct path from the transmitter to the receiver, additional copies may strike other surfaces and have a longer transmission path to the intended transmitter. These multipath copies of the signal arrive at a later time period and with some receiver architectures appear to be noise which can derogate the Signal to Noise Ratio (SNR). A reduced SNR negatively impacts the link budget in terms of detectable distance and/or data-rate achievable in the link. Modern receiver architectures typically employ Rake architectures, with multiple time offset fingers that collect the energy in the multipath copies and use it to improve SNR.

Figure 5:
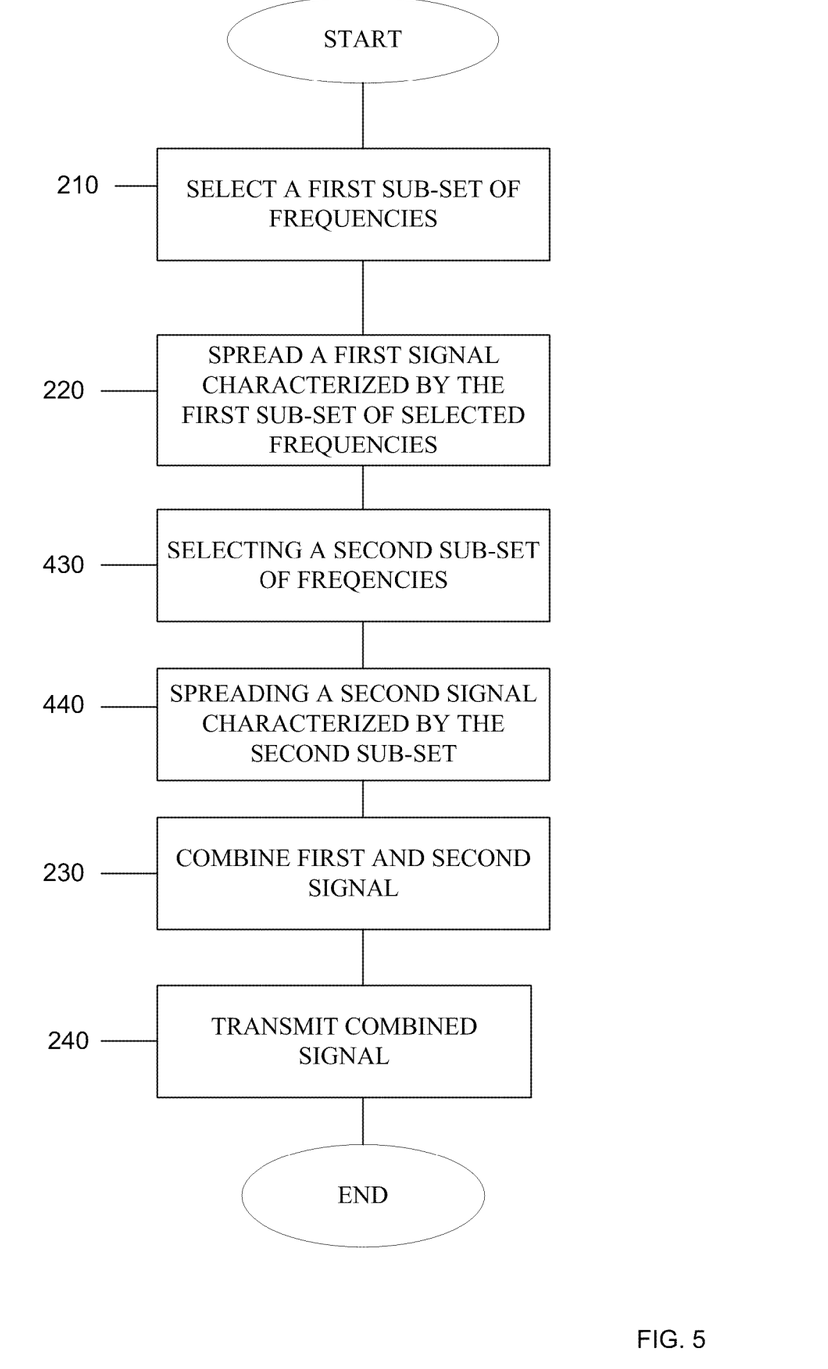
FIG. 5 is a flowchart illustrating the flow of a provided method.

Another embodiment of the flow of a provided method is illustrated in FIG. 5. In this embodiment flow begins by selecting a subset of frequencies from the set that would be present in a modulated complex pulse in block 210. Flow continues to block 220 where the signal characterized by the selected subset of frequencies is spread by a code. Flow continues to block 430 where a second set subset of frequencies from the set of frequencies that would be present from a modulated complex pulse are selected. In some embodiments, the modulated complex pulse from which the first sub-set of frequencies is selected is the same complex pulse from which the second sub-set is selected. In other embodiments, they are different complex pulses due to the modulation characteristics imparted by different data symbols. Flow then continues to block 440 where a signal characterized by the second sub-set is spread by a second code. The two spread signals are then combined in block 230 and the combined signal is transmitted in block 240.

In some embodiments of this method, similar to some described above, the complex signal comprises an in-phase component that may be approximated by the function $$\frac{\cos(x)}{x}$$

and the quadrature phase component may be approximated by function $$\frac{\sin(x)}{x}.$$

These components may be selected and modulated in the manner taught above. Further, as with other embodiments, the selection of a particular subset of frequencies can be done on the basis of its frequency band occupancy. Spreading codes used with these embodiments can be virtually any spreading codes known in the art, in some instances the first and the second codes are selected to be orthogonal to each other providing orthogonality between the first and second spread signals.

Figure 8:
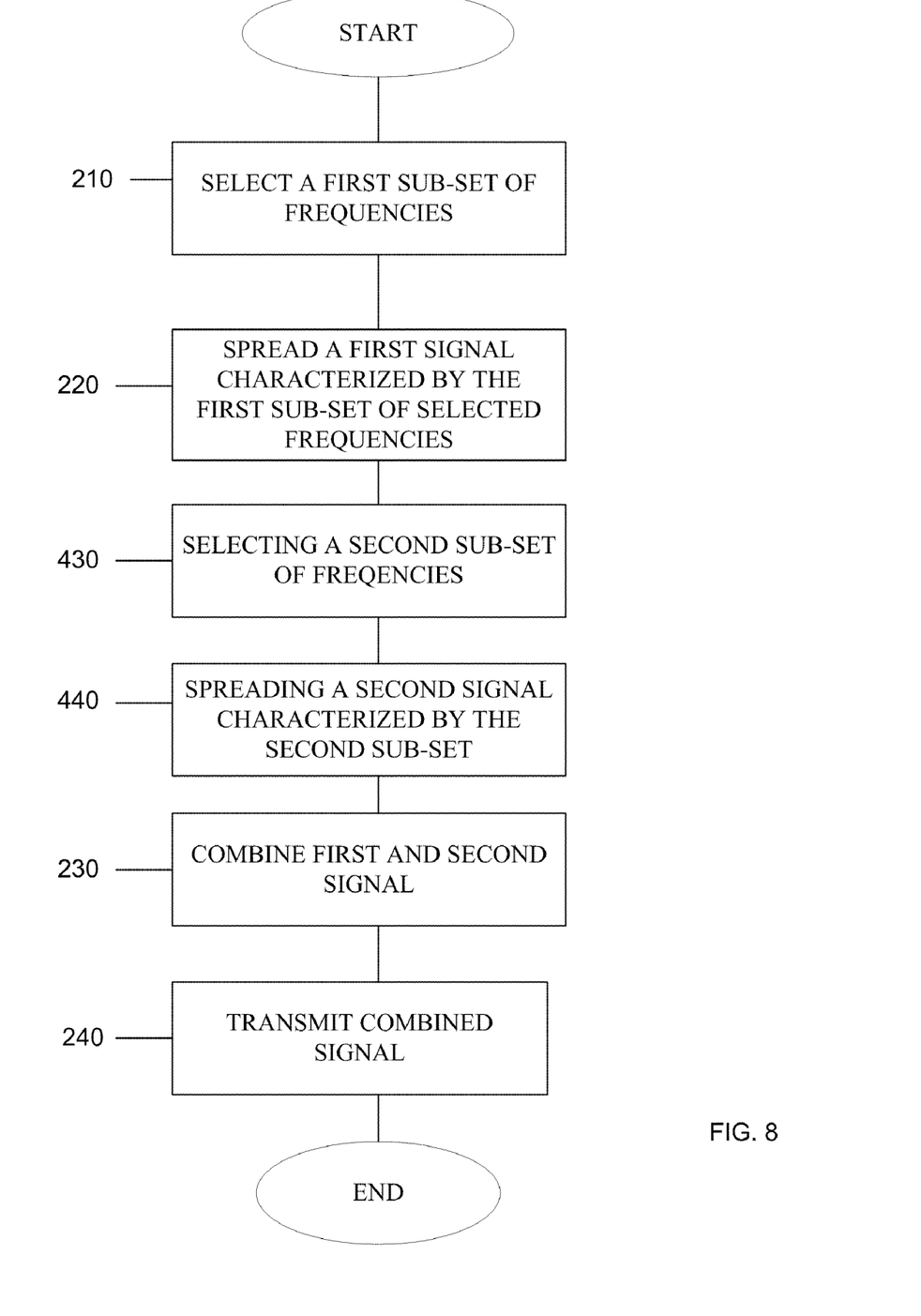
FIG. 8 is a flowchart illustrating the flow of a provided method.

A still further embodiment of a provided method is illustrated in FIG. 8. In many respects this embodiment is similar to other described embodiments in that flow begins by selecting a subset of frequencies from the set that would be present in a modulated complex pulse in block 210. Flow continues to block 220 where the signal characterized by the selected subset of frequencies is spread by a code. Flow continues to block 430 where a second set subset of frequencies from the set of frequencies that would be present from a modulated complex pulse are selected. In some embodiments, the modulated complex pulse from which the first sub-set of frequencies is selected is the same complex pulse from which the second sub-set is selected. In other embodiments, they are different complex pulses due to the modulation characteristics imparted by different data symbols. Flow then continues to block 440 where a signal characterized by the second sub-set is spread by a second code. The two spread signals are then combined in block 230. Flow then continued to block 250 where an additional spreading step is applied to the combined signal prior to its transmission in block 240.

One feature of this embodiment, is that each device in a network may be assigned a unique final spreading code that is applied to the combined signal prior to transmission. If codes assigned to all devices within the network are orthogonal to each other and unique to the device (similar to Long PN Codes in CDMA networks) the final spreading step ensures that signals from multiple devices arriving at a single receiver will be orthogonal to each other dramatically lowering the probability of interference between them. Additionally, since each code can be unique to a particular device, the receiver can determine which incident signal belongs to which transmitter by correlating the received signals with the known unique codes in a network.

In some embodiments, the process of combining the signals is done in a time staggered manner where the first and the second signal are not aligned in time. As discussed above, this allows modified rake receiver architectures to be used to process the signals individually instead of attempting to sum the incident energy from the rake fingers, they can be correlated individually as separate data symbols for increased data throughput.

Figure 9:
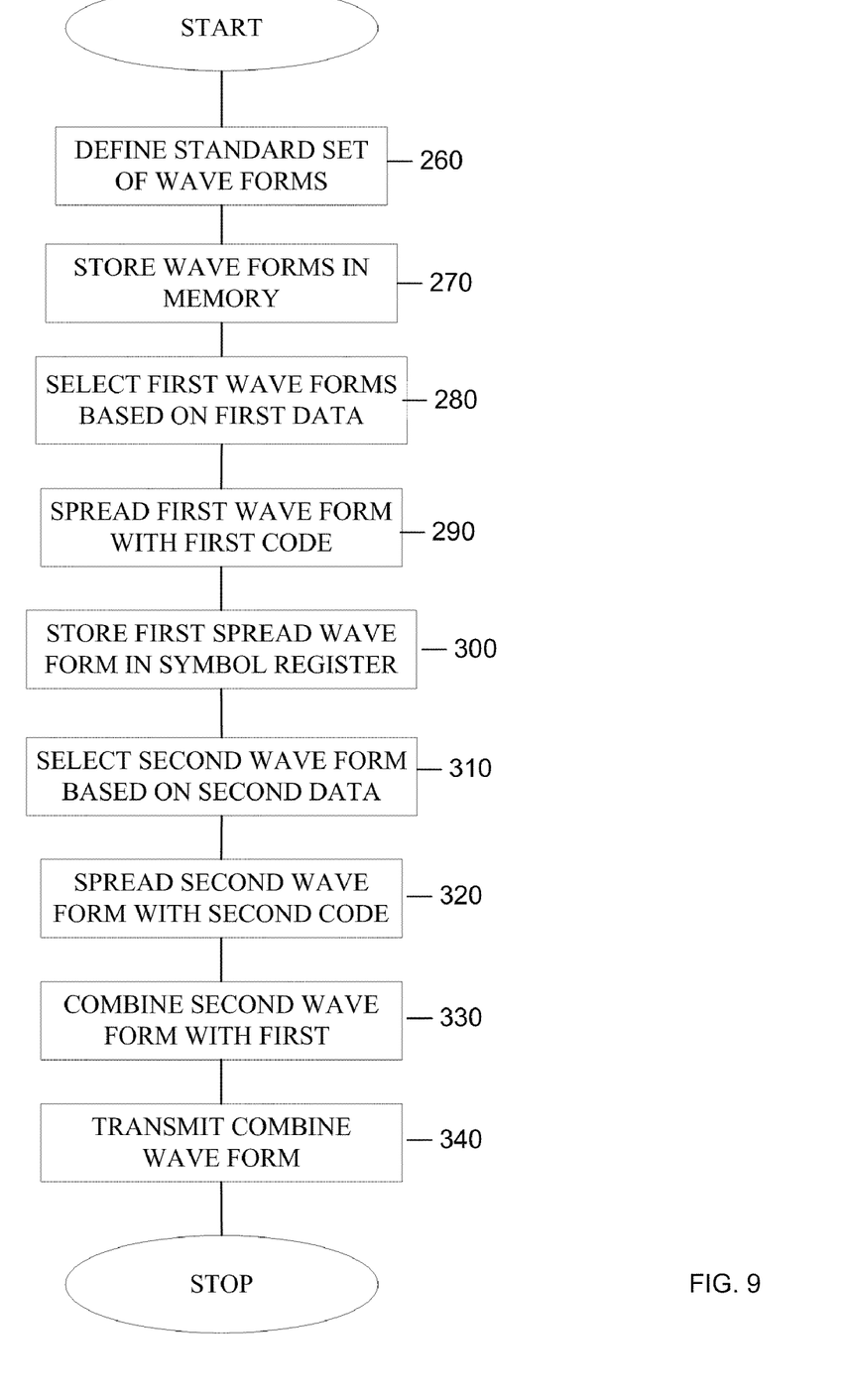
FIG. 9 is another flowchart illustrating the flow of an additional provided method.

Turning to FIG. 9, which illustrates the flow of another provided method. In the illustrated embodiment, flow begins in block 260 by defining a standard set of waveforms. In this embodiment, each of the standard set of waveforms represents a set of frequencies present within a complex pulse. Once the waveforms are defined, flow continues to block 270 where the waveforms are stored in memory. Flow then continues to block 280 where a particular waveform is retrieved from memory based on a first data symbol. The retrieved waveform is then spread by a first code in block 290 and stored in an accumulated symbol register in block 300. Flow then continues to block 310 where a second waveform is selected from memory based on a second data symbol. The second waveform is spread by a second code in block 320 and combined with the first spread waveform in block 330. The combined waveform is then transmitted in block 340.

In some embodiments, the standard waveforms are constructed to contain selected frequency components of a modulated complex pulse. In many of these embodiments, various characteristics of these waveforms are modified prior to storage in memory. For example, occupancy of certain frequency bands may be undesirable at signal levels above a regulatory mask level. In these instances, the waveforms can be modified to reduce the amount of signal energy they would contribute to frequency bands that are outside a regulatory mask. In other instances it may be desirable to pre-distort the waveforms to take into account known or predicted effects of the wireless transmission medium. As with other embodiments previously described the modulated pulse may take the characteristics of a number of modulation techniques listed above.

Figure 10:
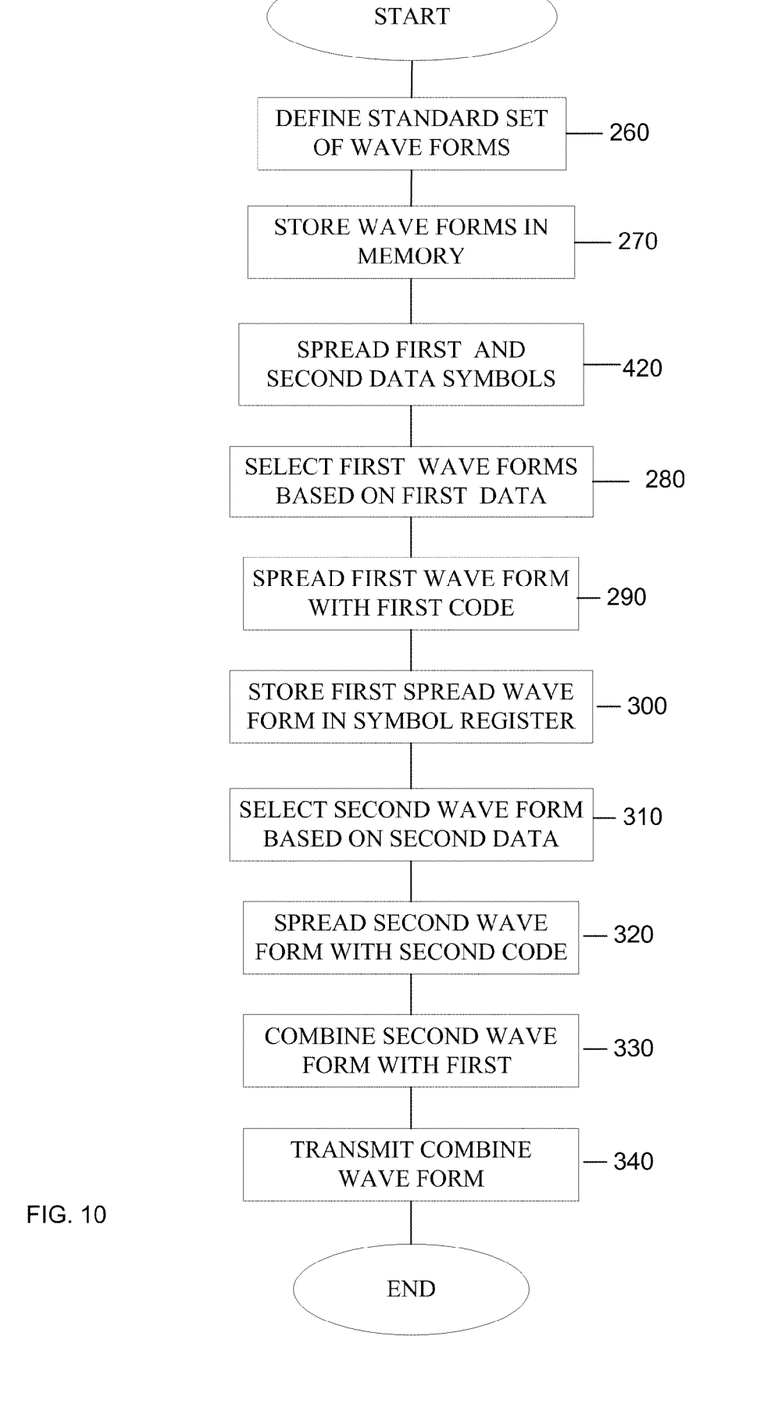
FIG. 10 is a further flow chart illustrating the flow of another provided method.

In some embodiments, illustrated by additional block 420 in FIG. 10, the data symbols are spread with codes prior to the selection of waveforms from memory. In these embodiments, the spread symbol typically comprises a number of chips and the selection of waveforms from memory may be done on a single chip basis or may be done based on a number of chips in the data symbol. In other embodiments, as discussed above, it is advantageous to spread the signal with an additional code prior to transmission. In still further embodiments the combined spread signal is upconverted to a desired frequency band prior to transmission. And while various embodiments of the present invention are not limited to transmission in a particular frequency band, there are distinct advantages to the use of the methods taught herein in the frequency bands between 5 MHz and 1 GHz.

In some embodiments, the combination of a spread waveform in the accumulated symbol register includes the addition (or in some instances) the subtraction of a time offset second spread waveform from the first stored waveform. In further embodiments these waveforms are combined in a manner where they substantially overlap. Since each of the waveforms have been spread with orthogonal codes, they are still differentiable at the receiver.

Some provided embodiments additionally incorporate sending redundant information on multiple signals. As is known in the art, there are a number of advantages that are realized with redundancy. First, the redundant information may be used to assist in error detection and correction. Additionally, it may be used to further improve the receivers ability to process very low power signals. In one embodiment, a data symbol is used to determine which waveform is selected from memory and this same data symbol is repeated multiple times yielding a lower data rate but a more resilient signal. To accomplish this, the different components are multiplied by a component specific vector. In some embodiments, the specific codes used are repeated to provide the redundancy.

With each of the components generating consistent results when upconverted, the results can be averaged across the various components. This approach will provide a frequency based processing gain equivalent to the number of frequencies used.

Figure 11:
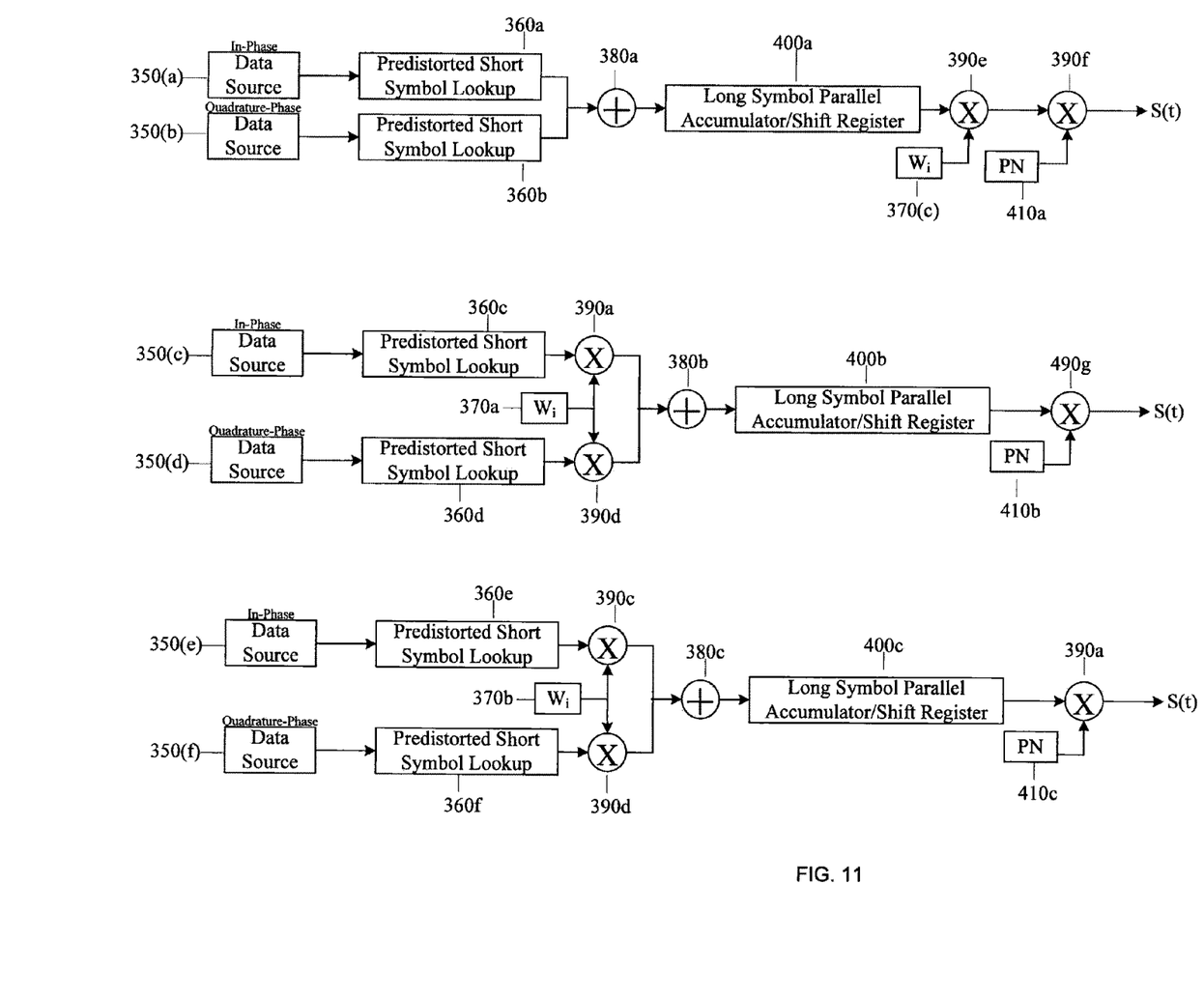
FIG. 11 illustrates a block diagram of one embodiment of a provided transmitter.

FIG. 11 illustrates the multichannel processing of a transmitter consistent with provided embodiments. As illustrated, data source 350(a) through 350(f) may include multiple in-phase and quadrature phase data channels. The data symbols originating from data sources 350(a) through 350(f) are used to identify specific pre-stored waveforms in look-memory blocks 360(a) through 360(b). As previously described, these waveforms may be modified or predistorted in a number of manners prior to storage. In some embodiments, the waveforms are directly combined, as illustrated by combiner 380(a) and in others the waveforms may be spread by codes generated by code generators 370(a) and 370(b). Spreaders 390(a) and 390(b) may use the same code to spread both waveforms or in some embodiments, code generator 370a may generate two orthogonal codes, one used by spreader 390(a) the other by spreader 390(b). In still further embodiments the codes generated by code generator 370(a) are orthogonal to the codes generated by code generator 370(b). The waveforms are then combined and stored in the accumulated symbol registers (illustrated here as Long Symbol Parallel Accumulator/Shift Registers 400(a) through 400(c), where they may be combined further with additional waveforms processed serially. As illustrated, some embodiments include further spreading with additional codes, generated by code generators 370(c), 410(a) through 410(c) by spreaders 390(f) through 390(g). Some provided architectures additionally include multiple processing chains each producing a signal s(t) which is then combined to form the final transmit signal.

Figure 12:
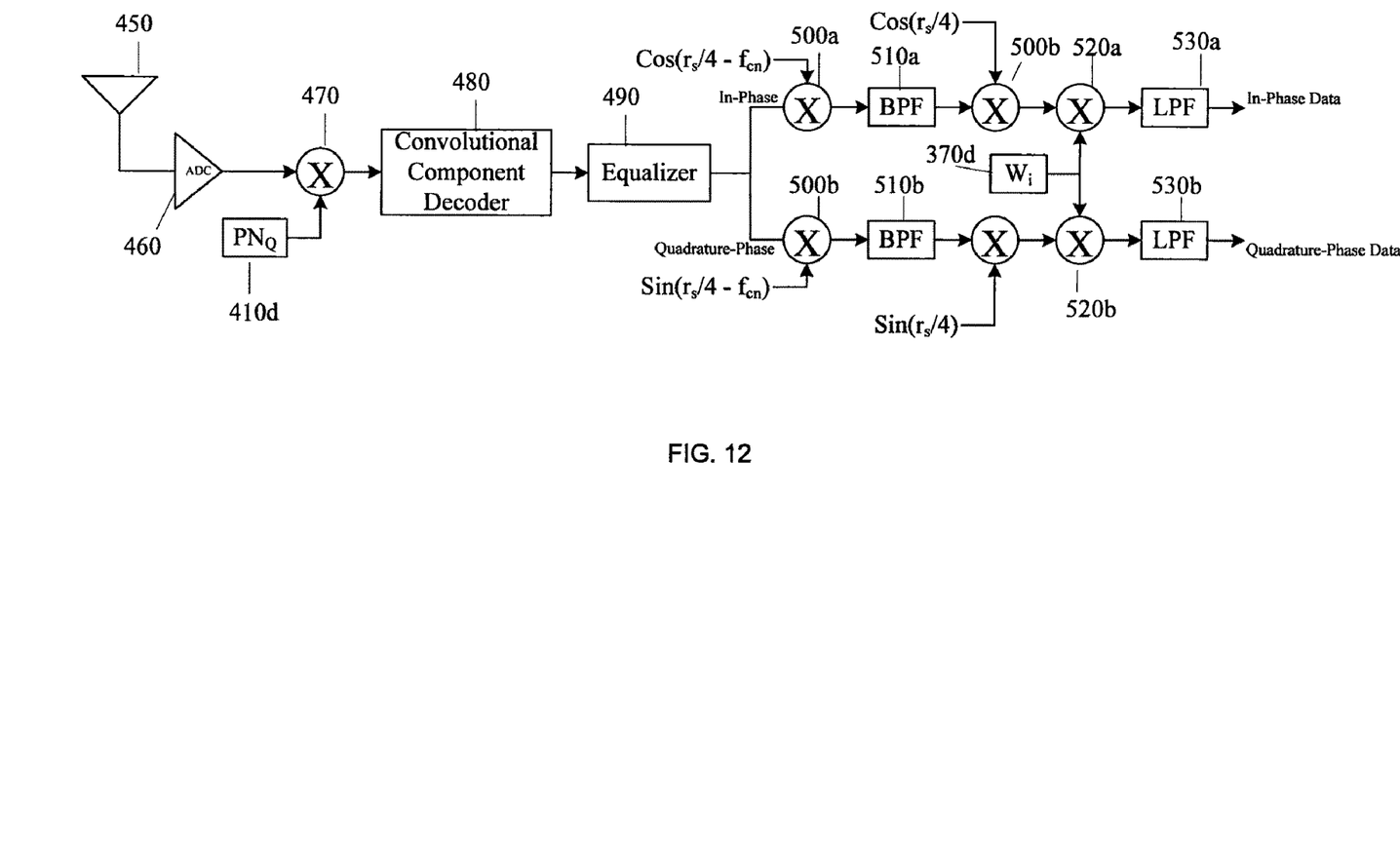
FIG. 12 illustrates a block diagram of one embodiment of a provided receiver.

FIG. 12 illustrates an architecture of a provided receiver. While other components may be necessary to build a receiver, they are commonly used in the art and are omitted here for convenience. Incoming data signals are incident on antenna 450 and are sampled by Analog to Digital Converter (ADC) 460. The output of ADC 460 is then multiplied by a code, supplied by code generator 410, in despreader 470. The signal is then separated into its component parts by Convolutional Component Decoder 480. The signals are then adjusted to account for possible distortion and noise in equalizer 490. The in-phase and quadrature phase components are then down converted to an intermediate frequency (IF) by down converters 500(a) and 500(b). The IF signals are then bandpass filtered by filters 510(a) and 510(b) to suppress out of band energy. The filtered signals are then mixed down to baseband frequencies by down converters 500(c) and 500(d). The signals are then further despread by despreaders 520(a) and 520(b) by a code supplied by code generator 370(d). The baseband data signals are then low-pass filtered by filters 530(a) and 530(b) to produce in-phase and quadrature phase data symbols.

In an exemplary embodiment ADC 460 is selected to have a sampling frequency significantly higher that the Nyquist frequency in order to allow more data samples for the deconvolution process in Convolutional Component Decoder 480. Data is processed out of the signal in a manner similar to how conventional modulation techniques process signals out of noise. In this case rather than processing gain, the processing results in increases in capacity. For example, some of the provided methods require a minimum of 4 samples per cycle, and this drives the minimum required sample rate to use a given frequency. To use a 100 MHz frequency the sample rates must be a minimum of 400 MSPS. To use an 800 MHz frequency the sample rate must be 3.2 GSPS. The higher sampling rates allow the multitude of phase shifts and inversions, etc. to be captured even though they are effectively limited to the bandwidth of a sine wave. For a given frequency, doubling the sampling rate cuts the bandwidth of the fundamental in half while doubling the resolution in the time domain, effectively increasing capacity by a factor of 4. This means for our 100 MHz carrier, increasing the sample rate from 400 MSPS to 800 MSPS increases the capacity by a factor of 4.

Performing deconvolution on the entire received spectrum is not possible with existing processing technology, so various embodiments provide a shortcut. A pulse generates massive amounts of energy throughout the spectrum. In the time domain, the energy for each of the harmonics taken individually is a sine wave that is predictable and has a long duration compared to the pulse duration and the sample rate. Having a million samples of a sine wave and knowing the exact time and frequency of the sine wave can allow the sine wave to be detected even though it is significantly below the noise, because the noise from cycle-to-cycle in the time domain is uncorrelated. In this manner, each of the harmonics of the pulse can be processed out of the noise. The resulting harmonics are then provided in a summarized fashion to an abbreviated deconvolution process. Millions of samples are processed into, in one embodiment, a 128 sample deconvolution calculation for each pulse. Using deconvolution allows the process to dynamically adapt to numerous transmission impairments that would prove lethal to conventional modulation techniques. The deconvolution process will find every trace of signal energy regardless of phase changes, mismatches, reflections etc. and convert it back into a pulse.

Processing a signal out of the noise drives the number of bits for the ADC sampling process. If we assume that we have a sine wave that is greater than the noise, we can detect the sine wave with a two bit ADC. A two bit ADC rounds measurements into 4 levels and so can measure power that is ¼th the dynamic range. Now if the amplitude of the sine wave is less than ¼th the amplitude of the noise, the sine wave will go undetected by the ADC. Adding bits to the ADC allows the least significant bits to measure smaller fluctuations and detect signals that are considerably dominated by noise. Since the signal-to-noise ratio (SNR) degrades with range, being able to support lower SNRs will increase operating range.

Thus, it is seen that a system, method and apparatus for dynamic content selection are provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A method of transmitting data from a wireless device, the wireless device comprising an antenna, a processor, and a data source, the method comprising:
    combining a first data symbol, from the data source, with a first code to form a first spread symbol;
    combining a second data symbol, from the data source, with a second code to form a second spread symbol;
    combining the first and the second spread symbols to form a combined symbol;
    generating a first complex pulse, the complex pulse comprising an in-phase component and a quadrature component;
    modulating a phase of the complex pulse with the combined symbol;
    computing, by the processor, a frequency domain representation of the modulated complex pulse;
    editing the frequency domain representation;
    computing a time domain response of the edited frequency domain representation; and
    transmitting the time domain response.

2. The method of claim 1 wherein the first and second codes are selected from a group consisting of: orthogonal codes, Walsh codes, orthogonal PN codes, quasi-orthogonal PN codes, gold codes, and Golay codes.

3. The method of claim 1, wherein the combining of the first and second data symbols with first and second codes comprises an operation selected from a group consisting of a multiplication operation and an exclusive or operation.

4. The method of claim 1, wherein the first and second data symbols substantially overlap in time.

5. The method of claim 1, wherein the in-phase component of the complex pulse has a shape approximately equivalent to $(\cos(x))/x$.

6. The method of claim 1, wherein the quadrature component of the complex pulse has a shape approximately equivalent to $(\sin(x))/x$.

7. The method of claim 1, wherein modulating the phase of the complex pulse comprises changing the phase of both the in-phase and quadrature components simultaneously based on data.

8. The method of claim 1, wherein modulating the phase of the complex pulse comprises changing the phase of both the in-phase and quadrature components individually based on data.

9. The method of claim 1, wherein editing the frequency domain representation comprises reducing an amplitude value at a frequency.

10. The method of claim 1, wherein editing the frequency domain representation comprises selecting at least one frequency component for further processing.

11. The method of claim 1, wherein transmitting the time domain response comprises a transmission from the antenna in the frequency band from approximately 5 MHz to approximately 1 GHz.

* * * * *